US012077124B2

United States Patent
Jang

(10) Patent No.: US 12,077,124 B2
(45) Date of Patent: Sep. 3, 2024

(54) AIRBAG APPARATUS FOR MOBILITY

(71) Applicant: HYUNDAI MOBIS CO., LTD., Seoul (KR)

(72) Inventor: Rae Ick Jang, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/352,630

(22) Filed: Jul. 14, 2023

(65) Prior Publication Data

US 2024/0157908 A1 May 16, 2024

(30) Foreign Application Priority Data

Nov. 15, 2022 (KR) .................. 10-2022-0152890

(51) Int. Cl.
*B60R 21/233* (2006.01)
*B60R 21/2338* (2011.01)
*B60R 21/239* (2006.01)

(52) U.S. Cl.
CPC ........ *B60R 21/233* (2013.01); *B60R 21/2338* (2013.01); *B60R 21/239* (2013.01); *B60R 2021/23308* (2013.01); *B60R 2021/23324* (2013.01); *B60R 2021/23382* (2013.01); *B60R 2021/2395* (2013.01)

(58) Field of Classification Search
CPC ... B60R 21/207; B60R 21/233; B60R 21/239; B60R 21/2338; B60R 21/23138
See application file for complete search history.

(56) References Cited

U.S. PATENT DOCUMENTS

| 9,738,243 | B2* | 8/2017 | Fukawatase | B60R 21/2338 |
| 11,167,717 | B2* | 11/2021 | Nakajima | B60R 21/2338 |
| 11,285,903 | B2* | 3/2022 | Kokeguchi | B60R 21/207 |
| 11,285,904 | B2* | 3/2022 | Jung | B60R 21/2338 |
| 11,548,468 | B2* | 1/2023 | Tanaka | B60R 21/239 |
| 11,713,014 | B1* | 8/2023 | Faruque | B60R 21/23138 |
| | | | | 280/728.1 |
| 11,772,592 | B2* | 10/2023 | Min | B60R 21/207 |
| | | | | 280/743.2 |
| 2017/0355344 | A1* | 12/2017 | Choi | B60R 21/235 |
| 2019/0283702 | A1* | 9/2019 | Yamada | B60R 21/2338 |

FOREIGN PATENT DOCUMENTS

KR   10-2012-0093832 A   8/2012

* cited by examiner

*Primary Examiner* — Faye M Fleming
(74) *Attorney, Agent, or Firm* — NovoTechIP International PLLC

(57) ABSTRACT

The present invention discloses an airbag apparatus for mobility that safely protects passengers even if an impact comes from different directions in collisions such as a front collision, a side collision, and an oblique collision as the airbags inflate to surround the passengers in the event of a collision.

10 Claims, 4 Drawing Sheets

AIRBAG APPARATUS FOR MOBILITY

CROSS-REFERENCE TO RELATED APPLICATIONS

The present application claims priority to Korean Patent Application No. 10-2022-0152890, filed on Nov. 15, 2022, the entire contents of which is incorporated herein for all purposes by this reference.

TECHNICAL FIELD

The present invention relates to an airbag apparatus for mobility that reliably protects passengers even in vehicle crashes in different directions.

BACKGROUND

Technologies are being developed to ensure passenger safety in addition to driving performance, convenience, and functionality.

In particular, airbags are employed as the most efficient device for protecting passengers from a vehicle crash, among various safety devices employed in vehicles.

As a device for protecting a driver and passengers in the event of a vehicle collision, such an airbag includes a collision sensor detecting a vehicle collision, a controller activating the airbag according to the detection result of the collision sensor, and an airbag module activating the airbag according to the signal of the controller and is classified as a driver airbag, a side airbag, a roof airbag, and the like according to the installation location or protection target.

In recent years, safety consideration has been given not only to front and side collisions but also to oblique collisions in which the vehicle is impacted diagonally. However, the airbag deploying from the front of the vehicle can protect passengers safely only in a front collision and cannot respond to the passenger's movement in the event of an oblique collision.

That is, in the case of an oblique collision, the passenger's upper body is displaced forward with a lateral tilt so that the passenger's upper body cannot be positioned within the protection range of the airbag deploying from the front. Further, in the event of an oblique collision, the problem is that the airbag deploying from the front rotates the head and torso and causes a secondary injury.

The matters described above as background art are only for a better understanding of the background of the present invention and are not to be considered as acknowledging that the present invention pertains to the related art already known to those skilled in the art.

SUMMARY

The present invention is proposed to resolve the issues described above and aims to provide an airbag apparatus for mobility that safely protects passengers even if an impact comes from different directions in collisions such as a front collision, a side collision, and an oblique collision as the airbags inflate to surround the passengers in the event of a collision.

The airbag apparatus for mobility according to the present invention for achieving the above object includes an airbag cushion which includes (i) a main chamber configured to be inflated by gas supplied from an inflator and to land on an upper body of a passenger when inflated and (ii) side chambers configured to be inflated by gas supplied from the main chamber, the side chambers being configured to be arranged on either side of the passenger to arrest lateral movement of the passenger when inflated, and a barrier disposed between the main chamber and the side chamber inside the airbag cushion that delays gas flow from the main chamber to the side chamber.

The airbag cushion is formed such that, when inflated, an upper portion of the main chamber supports the passenger's head and torso and a lower portion supports the passenger's legs.

The side chambers are positioned on either side of the passenger's head when the airbag cushion inflates.

The airbag cushion is provided with a tether connected to the main chamber and a first side chamber, and the tether is positioned inside the first side chamber.

The tether includes a first end connected to first side chamber and a second end connected to the main chamber at a position that is spaced apart from a position where a front of the passenger's head would be located in the main chamber.

The side chambers extend obliquely so as to spread outwardly from the main chamber when the airbag cushion inflates.

The barrier separates the main chamber and the side chambers and is provided with an opening through which gas is communicated from the main chamber to the side chambers.

Gas is introduced into the main chamber via an upper side of the main chamber, and the opening is formed on a lower side of the barrier so that the gas introduced into the main chamber flows from the upper side to a lower side of the main chamber and then flows to the side chambers through the opening hole.

The main chamber is provided with a vent hole and a shield film positioned over the vent hole, and the shield film is sewn to the main chamber and configured to rupture when a predetermined internal pressure is reached within the airbag cushion.

The airbag apparatus having a structure as described above safely protects passengers during collisions even if an impact comes from different directions, such as a front collision, a side collision, and an oblique collision, as the airbags inflate to surround the passengers in the event of a collision.

DETAILED DESCRIPTION

Figure 1:
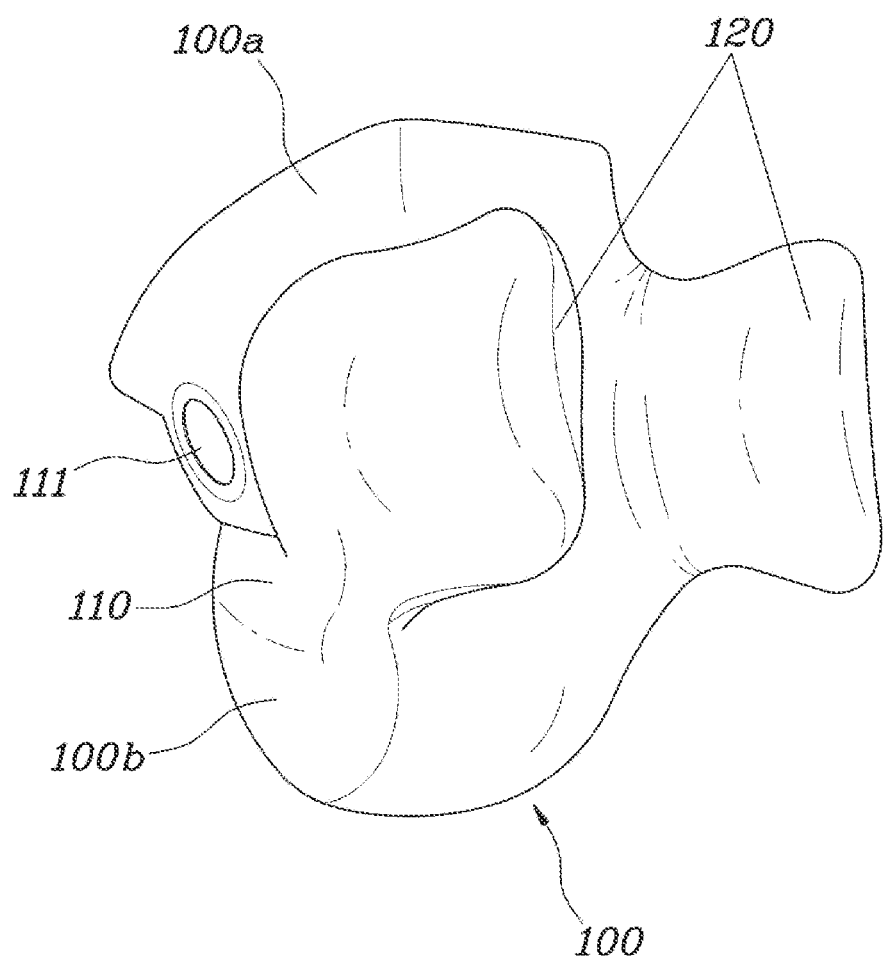
FIG. 1 is a view illustrating an airbag cushion according to an embodiment of the present invention.

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present invention.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

An airbag apparatus for mobility according to preferred embodiments of the present invention will be described with reference to the accompanying diagrams in the following.

Figure 2:
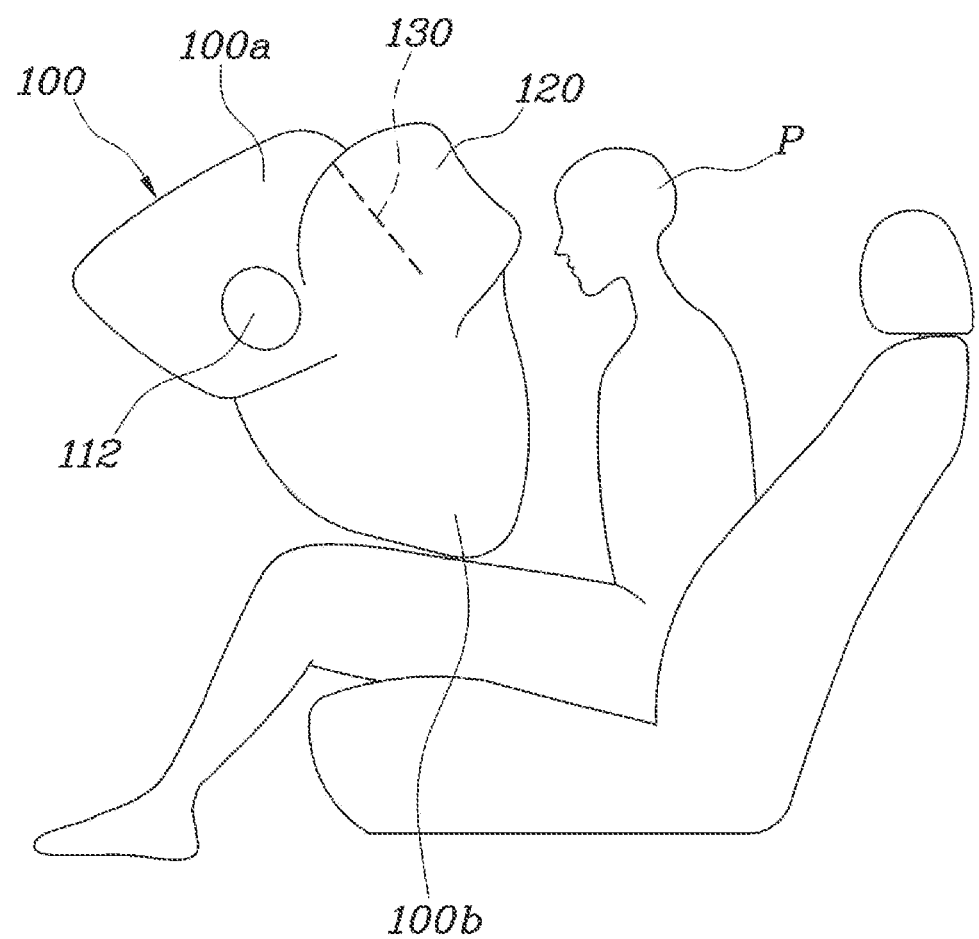
FIG. 2 is a view for describing an airbag apparatus for mobility according to an embodiment of the present invention.
Figure 3:
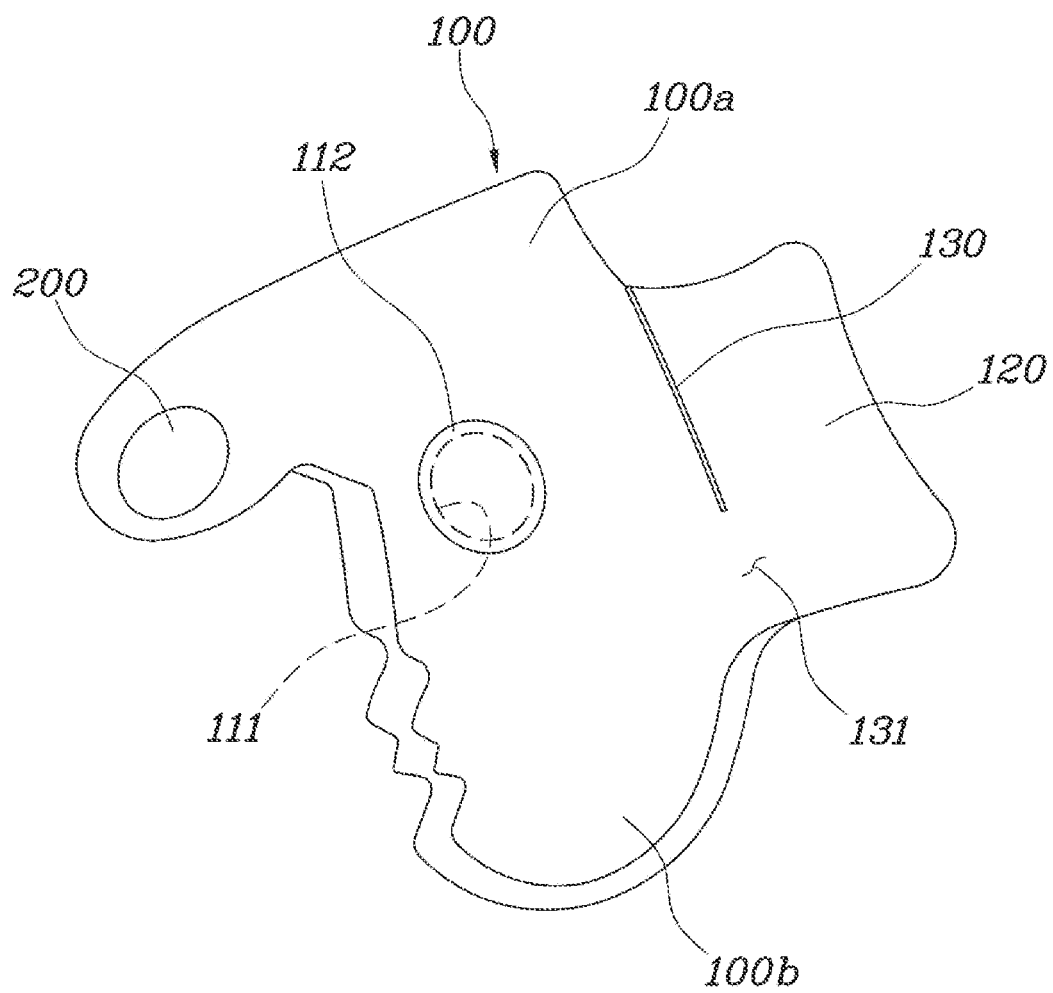
FIG. 3 is a cross-sectional view of the airbag apparatus for mobility illustrated in FIG. 1.
Figure 4:
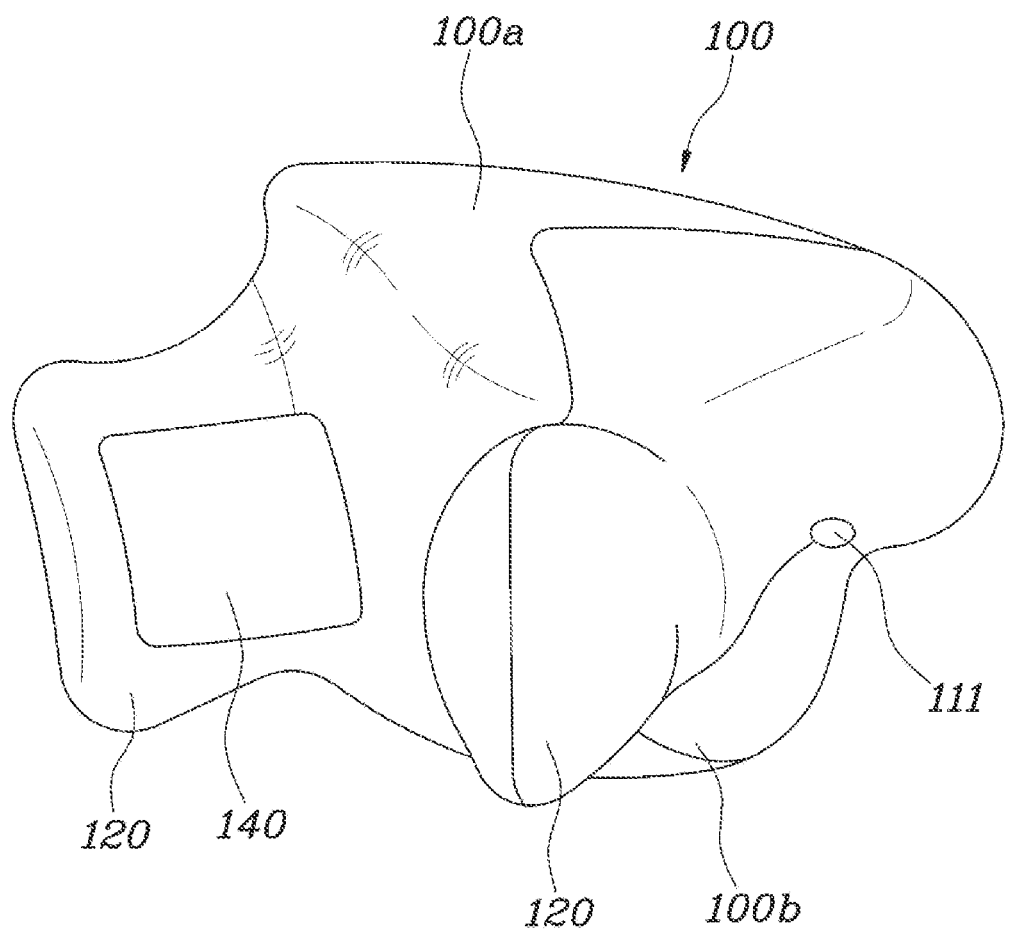
FIG. 4 is a view illustrating an airbag apparatus for mobility according to an embodiment of the present invention.

FIG. 1 is a view illustrating an airbag cushion according to an embodiment of the present invention, FIG. 2 is a view for describing an airbag apparatus for mobility according to an embodiment of the present invention, FIG. 3 is a cross-sectional view of the airbag apparatus for mobility illustrated in FIG. 1, and FIG. 4 is a view illustrating an airbag apparatus for mobility according to an embodiment of the present invention.

As illustrated in FIGS. 1 to 4, the airbag apparatus for mobility according to the present invention includes an airbag cushion 100 which includes a main chamber 110 formed to inflate by gas supplied from an inflator 200 and land on the passenger's upper body when inflated and a side chamber 120 formed to inflate by gas supplied from either side of the main chamber 110 and arranged on either side of the passenger to arrest the passenger's lateral movement when inflated and a barrier 130 disposed between the main chamber 110 and the side chamber 120 inside the airbag cushion 100 to delay gas flow from the main chamber 110 to the side chamber 120.

The airbag cushion 100 of the present invention may be configured to deploy from the front of the passenger and includes the main chamber 110 and the side chamber 120 to protect and restrain the passenger from an impact.

The airbag cushion 100 is inflated by gas generated by the inflator 200, and the inflator 200 is controlled by a controller. The controller detects a collision situation through various sensors and controls the timing of triggering the inflator 200.

The main chamber 110 forming the airbag cushion 100 is formed for the passenger's upper body to land thereon when inflated and the side chamber 120 is formed to arrest the passenger's lateral movement on either side of the passenger when inflated. Accordingly, the airbag cushion 100 may be formed in a 'C' shape, and as the passenger is surrounded and protected by the main chamber 110 and the side chamber 120, the impact is absorbed and an injury due to a snap of the passenger's head or torso is prevented.

On the other hand, the barrier 130 is provided inside the airbag cushion 100. The barrier 130 is provided between the main chamber 110 and the side chamber 120 and guides the flow of the gas flowing from the main chamber 110 to the side chamber 120 so that the gas provided by the inflator 200 does not flow from the main chamber 110 to the side chamber 120 immediately and the side chamber 120 is inflated after the main chamber 110 is sufficiently inflated.

Accordingly, when the airbag cushion 100 inflates, the main chamber 110 is first inflated by the gas provided by the inflator 200 to protect the passenger from the impact quickly and then the side chamber 120 is inflated to arrest the passenger's lateral movement.

To be more specific, the airbag cushion 100 may be formed such that, when inflated, an upper portion 100a of the main chamber 110 supports the passenger's head and torso and a lower portion 100b supports the passenger's legs.

As illustrated in FIG. 2, since the main chamber 110 supports the passenger's upper body and lower body when the airbag cushion 100 inflates, the airbag cushion 100 protects the passenger from impact and restrains the passenger's position.

Accordingly, the main chamber 110 is formed such that the upper portion 100a corresponds to the passenger's head and torso so that the passenger's upper body lands on the upper portion 100a of the main chamber 110 and is protected, and the lower portion 100b supports the thighs by pressing from above the legs so that the passenger's legs are not lifted upward or the passenger's seating position remains unchanged.

The side chamber 120 may be positioned on either side of the passenger's head when the airbag cushion 100 inflates.

A pair of side chambers 120 are respectively provided on either side of the main chamber 110 and are positioned on either side of the passenger's head, which lands on the main chamber 110, and supports the passenger's head to prevent a neck snap. Accordingly, the side chamber 120 may be provided on the upper side of the main chamber 110 and the inflated size thereof may be set not to interfere with the passenger's shoulder portion.

On the other hand, according to an embodiment of the present invention, as illustrated in FIG. 4, the airbag cushion 100 may be provided with a tether 140 connected to the main chamber 110 and the side chamber 120, and the tether may be positioned inside the side chamber 120.

The tether 140 provides a pulling force to the side chamber 120 to prevent the side chamber 120 from pulling away from the main chamber 110. To this end, the tether 140 is provided inside the side chamber 120 and is connected to the main chamber 110 and the side chamber 120 so that the pulling force can be provided in the direction in which the pair of side chambers 120 face each other.

In particular, when a collision causes the airbag cushion 100 to inflate in mobility, the main chamber 110 supports the passenger's head and torso. When the main chamber 110 is pressed by the passenger, the side chambers 120 on either side collapse inward by the pulling force of the tether 140 and deform so that the passenger is surrounded and restrained.

Specifically, the tether 140 may be connected to an end of the side chamber 120 at one end and the main chamber 110 at the other end and may be connected away from the front of the passenger's head in the main chamber 110.

That is, the tether 140 may be connected to the inside of the end of the side chamber 120 at one end and also connected to the outside of the end of the side chamber 120 so that a greater amount of variation of the side chamber 120 caused by the passenger's loading in the main chamber may be secured.

In addition, the tether 140 is connected to the main chamber 110 at the other end away from the front of the passenger's head so that direct contact with the tether 140 is avoided when the passenger lands on the main chamber 110. If the passenger comes into contact with the tether 140 when landing on the inflated main chamber 110, the repositioning of the side chamber 120 may be actively performed, but the tether 140 may cause a head snap or an injury.

Accordingly, the tether 140 is connected to the end of the side chamber 120 at one end and to the side chamber 120 side at the other end, away from the portion of the main chamber 110 which is in contact with the passenger's head, so that the passenger's injury by the tether 140 is prevented while the side chamber 120 surrounds the passenger when the airbag cushion 100 inflates.

On the other hand, the side chamber 120 may be provided to extend obliquely so as to spread outwardly from the main chamber 110 when the airbag cushion 100 inflates.

In this way, the pair of side chambers 120 are provided to spread outward in the direction away from the main chamber 110 so that the side chamber 120 avoids striking the passenger's head when the airbag cushion 100 inflates.

In addition, the side chamber 120 obliquely extends outwardly so that a passenger landing on the side chamber 120 is guided to the center of the main chamber 110 along the slope of the side chamber 120, and protection by the main chamber 110 is secured. Also, when the airbag cushion 100 inflates, the pair of side chambers 120 deform to collapse inward by the tether 140 described above to arrest the passenger's lateral movement so that the impact to the passenger is minimized through the main chamber 110 and the side chamber 120.

On the other hand, as illustrated in FIG. 3, the barrier 130 may separate the main chamber 110 and the side chamber 120 and be provided with an opening 131 through which gas is communicated from the main chamber 110 to the side chamber 120.

In this way, the barrier 130 separates the main chamber 110 and the side chamber 120 so that the main chamber 110 first inflates by the gas provided by the inflator 200. In addition, the opening 131 is formed in the barrier 130 so that the gas provided by the inflator 120 inflates the main chamber 110 by a predetermined volume and more and then flows to the side chamber 120 through the opening 131 of the barrier 130 to inflate the side chamber 120.

That is, the inflator 200 is configured to supply gas to the upper side of the main chamber 110 and the opening 131 is formed on the lower side of the barrier 130 so that gas supplied from the inflator 200 flows from the upper side to the lower side of the main chamber 110 and then flows to the side chamber 120 through the opening 131.

As a result, the gas provided by the inflator 200 initially enters the upper portion 100*a* of the main chamber 110 and is guided downward by the barrier 130 separating the side chamber 120 to inflate both the lower portion 100*b* of the main chamber 110 first.

Here, the gas flowing to the lower portion 100*b* of the main chamber 110 flows to the side chamber 120 through the opening 131 of the barrier 130 so that the side chamber 120 inflates later than the main chamber 110.

As described above, by the structure in which the main chamber 110 first inflates and then the side chamber 120 inflates later, the deployment speed of the main chamber 110 increases, and thus the airbag cushion 100 can quickly protect the passenger. Delayed inflation of the side chamber 120 compared to the main chamber 110 allows the side chamber 120 to inflate without interference from the passenger and deploy in the form of surrounding and restraining the passenger landing on the main chamber 110.

In particular, the gas provided to the side chamber 120 is discharged only through the opening 131 so that delayed inflation of the side chamber 120 can maintain protection and restraint of the passenger.

On the other hand, the main chamber 110 may be provided with a vent hole 111 and a shield film 112 for closing the vent hole 111, and the shield film 112 may be sewn to the main chamber 110 so as to rupture by a predetermined internal pressure when the airbag cushion 100 inflates.

The vent hole 111 is formed in the main chamber 110 so that the gas inside the airbag cushion is discharged through the vent hole 111 after the airbag cushion 100 fully deploys However, since the shield film 112 is sewn to the main chamber 110, the vent hole 111 is initially closed. As the airbag cushion 100 fully deploys and the internal pressure accumulates by the passenger's loading in the main chamber 110, the shield film 112 ruptures to open up.

As a result, the airbag cushion 100 is inflated by the gas provided by the inflator 200 to absorb the impact that would otherwise be passed along to the passenger, and the shield film 112 ruptures by the passenger's loading to open up the vent hole 111 for the gas to be discharged through the vent hole 111 so that an injury to the passenger caused by excessive inflationary pressure of the airbag cushion 100 can be prevented.

The vent hole 111 may be located far away from the side chamber 120 in the main chamber 110 to delay the inflation of the side chamber 120 so that the time for restraining the passenger through the side chamber 120 can be secured.

The airbag apparatus for mobility having a structure as described above safely protects passengers even if an impact comes from different directions in collisions such as a front collision, a side collision, and an oblique collision as the airbags inflate to surround the passengers in the event of a collision.

Specific embodiments of the present invention have been illustrated and described, but it is self-evident to those skilled in the art that the present invention may be variously improved upon and modified within the scope not deviating from the technical spirit of the present invention provided by the claims below.

What is claimed is:

1. An airbag apparatus for mobility, comprising:
   an airbag cushion including (i) a main chamber configured to be inflated by gas supplied from an inflator and to land on an upper body of a passenger when inflated and (ii) side chambers configured to be inflated by gas supplied from the main chamber, the side chambers being arranged on either side of the passenger to arrest lateral movement of the passenger when inflated; and a barrier disposed between the main chamber and the side chambers inside the airbag cushion that delays gas flow from the main chamber to the side chambers, wherein the airbag cushion includes an upper portion that, when inflated, supports the head and torso of the passenger and a lower portion that, when inflated, supports legs of the passenger.

2. The apparatus of claim 1, wherein the side chambers are positioned on either side of the head of the passenger when the side chambers are inflated.

3. The apparatus of claim 1, wherein the airbag cushion includes a tether connected to the main chamber and a first side chamber of the side chambers, the tether being positioned inside the first side chamber.

4. The apparatus of claim 3, wherein the tether includes a first end connected to the first side chamber and a second end connected to the main chamber at a position spaced apart from a position where the front of the passenger's head would be located in the main chamber.

5. The apparatus of claim 1, wherein the side chambers extend obliquely and spread outwardly from the main chamber when the airbag cushion inflates.

6. The apparatus of claim 1, wherein the barrier separates the main chamber from the side chambers and includes an opening through which the gas is communicated from the main chamber to the side chambers.

7. The apparatus of claim 6, wherein:
the main chamber includes an upper side via which the gas is introduced into the main chamber, and
the opening is formed on a lower side of the barrier so that the gas introduced into the main chamber flows from the upper side to a lower side of the main chamber and then flows to the side chambers through the opening.

8. The apparatus of claim 7, wherein:
the main chamber is provided with a vent hole and a shield film positioned over the vent hole, and the shield film is sewn to the main chamber and is configured to rupture when a predetermined internal pressure is reached within the airbag cushion.

9. An airbag apparatus for mobility, comprising:
an airbag cushion including (i) a main chamber configured to be inflated by gas supplied from an inflator and to land on an upper body of a passenger when inflated and (ii) side chambers configured to be inflated by gas supplied from the main chamber, the side chambers being arranged on either side of the passenger to arrest lateral movement of the passenger when inflated; and
a barrier disposed between the main chamber and the side chambers inside the airbag cushion that delays gas flow from the main chamber to the side chambers,
wherein the airbag cushion includes a tether connected to the main chamber and a first side chamber of the side chambers, the tether being positioned inside the first side chamber.

10. An airbag apparatus for mobility, comprising:
an airbag cushion including (i) a main chamber configured to be inflated by gas supplied from an inflator and to land on an upper body of a passenger when inflated and (ii) side chambers configured to be inflated by gas supplied from the main chamber, the side chambers being arranged on either side of the passenger to arrest lateral movement of the passenger when inflated; and
a barrier disposed between the main chamber and the side chambers inside the airbag cushion that delays gas flow from the main chamber to the side chambers,
wherein:
the main chamber includes an upper side via which the gas is introduced into the main chamber, and
an opening is formed on a lower side of the barrier so that the gas introduced into the main chamber flows from the upper side to a lower side of the main chamber and then flows to the side chambers through the opening.

* * * * *